United States Patent
Ryan et al.

(10) Patent No.: US 9,514,182 B2
(45) Date of Patent: **\*Dec. 6, 2016**

(54) TECHNIQUES FOR MANAGING DATA RELATIONSHIPS

(75) Inventors: Thomas Kevin Ryan, Valley Center, CA (US); Carl Lewis Christofferson, Escondido, CA (US); Neelesh Bansode, Bangalore (IN); Santosh Kumar Singh, Bangalore (IN); Latesh Pant, Bangalore (IN)

(73) Assignee: Teradata US, Inc., Dayton, OH (US)

( * ) Notice: Subject to any disclaimer, the term of this patent is extended or adjusted under 35 U.S.C. 154(b) by 693 days.

This patent is subject to a terminal disclaimer.

(21) Appl. No.: 12/633,200

(22) Filed: Dec. 8, 2009

(65) Prior Publication Data

US 2011/0137957 A1 Jun. 9, 2011

(51) Int. Cl.
  *G06F 7/00* (2006.01)
  *G06F 17/30* (2006.01)

(52) U.S. Cl.
  CPC ................. *G06F 17/30398* (2013.01)

(58) Field of Classification Search
  CPC combination set(s) only.
  See application file for complete search history.

(56) References Cited

U.S. PATENT DOCUMENTS

| | | | |
|---|---|---|---|
| 6,230,161 B1 * | 5/2001 | Berkland et al. | |
| 7,376,658 B1 * | 5/2008 | Bumgarner et al. | 707/736 |
| 7,437,378 B2 * | 10/2008 | Minium et al. | |
| 7,523,121 B2 | 4/2009 | Hoang | |
| 7,536,407 B2 | 5/2009 | Lei | |
| 7,587,428 B2 | 9/2009 | Barabas et al. | |
| 7,599,947 B1 | 10/2009 | Tolbert et al. | |
| 7,603,377 B2 | 10/2009 | Awad et al. | |
| 7,860,902 B2 * | 12/2010 | Brendle et al. | 707/809 |
| 2001/0027488 A1 * | 10/2001 | Hodgkin et al. | 709/229 |
| 2006/0143220 A1 * | 6/2006 | Spencer | 707/102 |
| 2007/0028189 A1 * | 2/2007 | Robbins | 715/853 |
| 2008/0313211 A1 | 12/2008 | Dang et al. | |
| 2009/0125828 A1 | 5/2009 | Fried et al. | |
| 2009/0144293 A1 | 6/2009 | Chowdhury | |
| 2010/0083183 A1 * | 4/2010 | Yan | 715/843 |

\* cited by examiner

*Primary Examiner* — Thu Nga Nguyen
(74) *Attorney, Agent, or Firm* — Schwegman, Lundberg & Woessner, P.A.

(57) ABSTRACT

Techniques for managing data relationships are presented. A database element from a first database table is linked with a database element of a second database table via a Graphical User Interface as directed by a user. The link establishes a data relationship having attributes and properties. The relationship along with the attributes and properties are graphically presented to the user for inspection and analysis.

7 Claims, 8 Drawing Sheets

MANAGE OBJECT

SEARCH

OBJECT NAME: [ ]   OBJECT DESCRIPTION: [ ]   SHOW ALL

OBJECT DETAILS: PAGE 1 OF 4

| ROID | OBJECT NAME | OBJECT DESCRIPTION | LOGICAL TABLE NAME | PHYSICAL VIEW NAME | URL |
|---|---|---|---|---|---|
| ○ 122 | ATTRIBUTE SET | ATTRIBUTE SET | ATTRIBUTE SET | | HTTP://LOCALHOST:7001/MDM/BCM/FRAMEWORK/TABLEEDITOR/TABLEEDITOR |
| ○ 158 | ATTRIBUTE SET DETAIL | ATTRIBUTE SET DETAIL | ATTRIBUTE SET DETAIL | | HTTP://LOCALHOST:7001/MDM/BCM/FRAMEWORK/TABLEEDITOR/TABLEEDITOR |
| ○ 114 | CITY | CITY | CITY | | HTTP://LOCALHOST:7001/MDM/BCM/FRAMEWORK/TABLEEDITOR/TABLEEDITOR |
| ○ 185 | CLASSIFICATION ERROR MAP | CLASSIFICATION ERROR MAP | CLASSIFICATION ERROR MAP | | HTTP://LOCALHOST:7001/MDM/BCM/FRAMEWORK/TABLEEDITOR/TABLEEDITOR |
| ○ 204 | COUNTRY | COUNTRY | COUNTRY | | HTTP://LOCALHOST:7001/MDM/BCM/FRAMEWORK/TABLEEDITOR/TABLEEDITOR |
| ○ 191 | CROSS REFERENCE | CROSS REFERENCE | CROSS REFERENCE | | HTTP://LOCALHOST:7001/MDM/BCM/FRAMEWORK/TABLEEDITOR/TABLEEDITOR |
| ○ 197 | CROSS REF RELATION | CROSS REF RELATION | CROSS REF RELATION | | HTTP://LOCALHOST:7001/MDM/BCM/FRAMEWORK/TABLEEDITOR/TABLEEDITOR |
| ○ 166 | CUSTOM RODY TABLE | CUSTOM RODY TABLE | CUSTOM RODY TABLE | | HTTP://LOCALHOST:7001/MDM/BCM/FRAMEWORK/TABLEEDITOR/TABLEEDITOR |
| ○ 188 | DEPT | DEPT | DEPT | | HTTP://LOCALHOST:7001/MDM/BCM/FRAMEWORK/TABLEEDITOR/TABLEEDITOR |
| ○ 201 | DIVISION | DIVISION | DIVISION | | HTTP://LOCALHOST:7001/MDM/BCM/FRAMEWORK/TABLEEDITOR/TABLEEDITOR |

◀◀ ◀ ▶ ▶▶   JUMP   BACK   EDIT

Fig. 4

| OBJECT DEFINITION | |
|---|---|
| OBJECT NAME:* | |
| OBJECT DESCRIPTION: | |
| OBJECT DATA SOURCE: | ATTRIBUTE SET ▶ |
| MASTER DATA URL: | |
| URL PARAMETER: | |
| NO. OF LINK COLUMNS: | 1 ▶ |
| LINK COLUMN 1: | ATTRIBUTE SET ID ▶ |
| NO. OF DISPLAY COLUMNS: | 1 ▶ |
| DISPLAY COLUMN NAMES 1: | ATTRIBUTE SET ID ▶ |
| NO. OF SORT COLUMNS: | 1 ▶ |
| SORT COLUMN NAME 1: | ATTRIBUTE SET ID ▶ |

[CANCEL] [BACK] [SAVE AND RETURN]

MANAGE RELATIONSHIP

PARENT OBJECTS: [SELECT...▼]

DATA RELATIONSHIP: PAGE 1 OF 1

| | ROW ID | RELATION NAME | RELATION DESCRIPTION | PARENT OBJECT NAME | CHILD OBJECT NAME | | | SHOW ALL | SEARCH |
|---|---|---|---|---|---|---|---|---|---|
| ○ | 101 | ATTRIBUTE_SET_DETAIL | | ATTRIBUTE_SET | ATTRIBUTE_SET_DETAIL | | | | |
| ○ | 105 | MGR_EMP | MGR_EMP_DESC | MANAGER | EMPLOYEE | | | | |

[◀◀][◀][▶][▶▶] [JUMP]

SELECTED PARENT DATA

ATTRIBUTE_SET

| ATTRIBUTESETID | UPDATEDLOGICALTABLENAME | UPDATEDPHYSICALTABLENAME | NAME | DESCRIPTION | SOURCE | CREATED_BY | CREATION_DATE | ENTITY_STATE | VIEW | CREATE |
|---|---|---|---|---|---|---|---|---|---|---|
| 12 | TABLE_1 | | ATTR_NAME_345 | ATTR_DESC_345 | BACKEND | | | | | |

[◀◀][◀][▶][▶▶] [JUMP]

SEARCH

ATTRIBUTE_SET_DETAIL

| ATTRIBUTE_SET_ID | UPDATEDLOGICALCOLUMNNAME | UPDATEDPHYSICALCOLUMNNAME | DESCRIPTION | SOURCE | CREATED_BY | CREATION_DATE | SHOW ALL | SEARCH |
|---|---|---|---|---|---|---|---|---|
| | | | | | | | | |

[◀◀][◀][▶][▶▶] [JUMP]

SELECT CHILD DATA

ATTRIBUTESEIDETAIL: PAGE 1 OF 2

| | ATTRIBUTESETID | UPDATEDLOGICALCOLUMNNAME | UPDATEDPHYSICALCOLUMNNAME | DESCRIPTION | SOURCE | CREATED_BY | CREATION_DATE | ENTITY_STATE | LAST_MODIFIED |
|---|---|---|---|---|---|---|---|---|---|
| ☐ | 10 | ATTRIBUTESETID | | | BACKEND | | | | |
| ☐ | 5 | ATTRIBUTESETID | | | BACKEND | | | | |

[◀◀][◀][▶][▶▶] [JUMP]

[BACK] [LINK DATA]

Fig. 7

VIEW RELATIONSHIP

RELATION NAME: MGR_EMP                    RELATION DESCRIPTION: MGR_EMP DESC

PARENT OBJECT NAME: MANAGER               CHILD OBJECT NAME: EMPLOYEE
PARENT TABLE NAME: EMPLOYEE               CHILD TABLE NAME: EMPLOYEE

PARENT COLUMN MAP1: MGR_ID                CHILD COLUMN MAP1: EMP_ID

[BACK]  [VIEW DATA RELATION]  [DEFINE DATA RELATION]

Fig. 8

DEFINE ADDITIONAL ATTRIBUTE (1-2)

PROPERTY NAME:*
PROPERTY DESCRIPTION:
DEFAULT VALUE:
DATA TYPE: VARCHAR ▼
RELATION OBJECT PROPERTY VALUE: ROPVALUE1 ▼
IS NULLABLE: ☐

[CANCEL]  [BACK]  [NEXT]

TECHNIQUES FOR MANAGING DATA RELATIONSHIPS

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots, images, and source code as described below and in any drawings hereto: Copyright © 2009, Teradata, Inc. of Miamisburg, Ohio—All Rights Reserved.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals.

The enterprise data can originate from a myriad of sources and even external feeds, but ultimately the goal for the enterprise is that all the data be consolidated, indexed, and related within a central enterprise data warehouse.

A major portion of data warehouse management is defining and managing data relationships. A data relationship is data needed to control an association of one piece of data within the data warehouse with another piece of data within the data warehouse. Often this control requires enforcement of enterprise business processes; some processes are automated and some processes are manual.

Thus, it can be seen that improved techniques for data relationship management are desirable.

SUMMARY

In various embodiments, techniques for managing data relationships are presented. According to an embodiment, a method for establishing a data relationship is presented. Specifically, a user is dynamically interacted with to identify a first element from a first database table and a second element from a second database table. Next, the first element and the second element are linked in a third database table to create a relationship between the first element and the second element in the third database table. Finally, attributes and properties of the relationship are dynamically presented to the user.

BRIEF DESCRIPTION OF THE DRAWINGS

FIGS. 4-8 are sample Graphical User Interface (GUI) screens for defining and managing data relationships described in FIGS. 1-3, according to an example embodiment.

DETAILED DESCRIPTION

Figure 1:
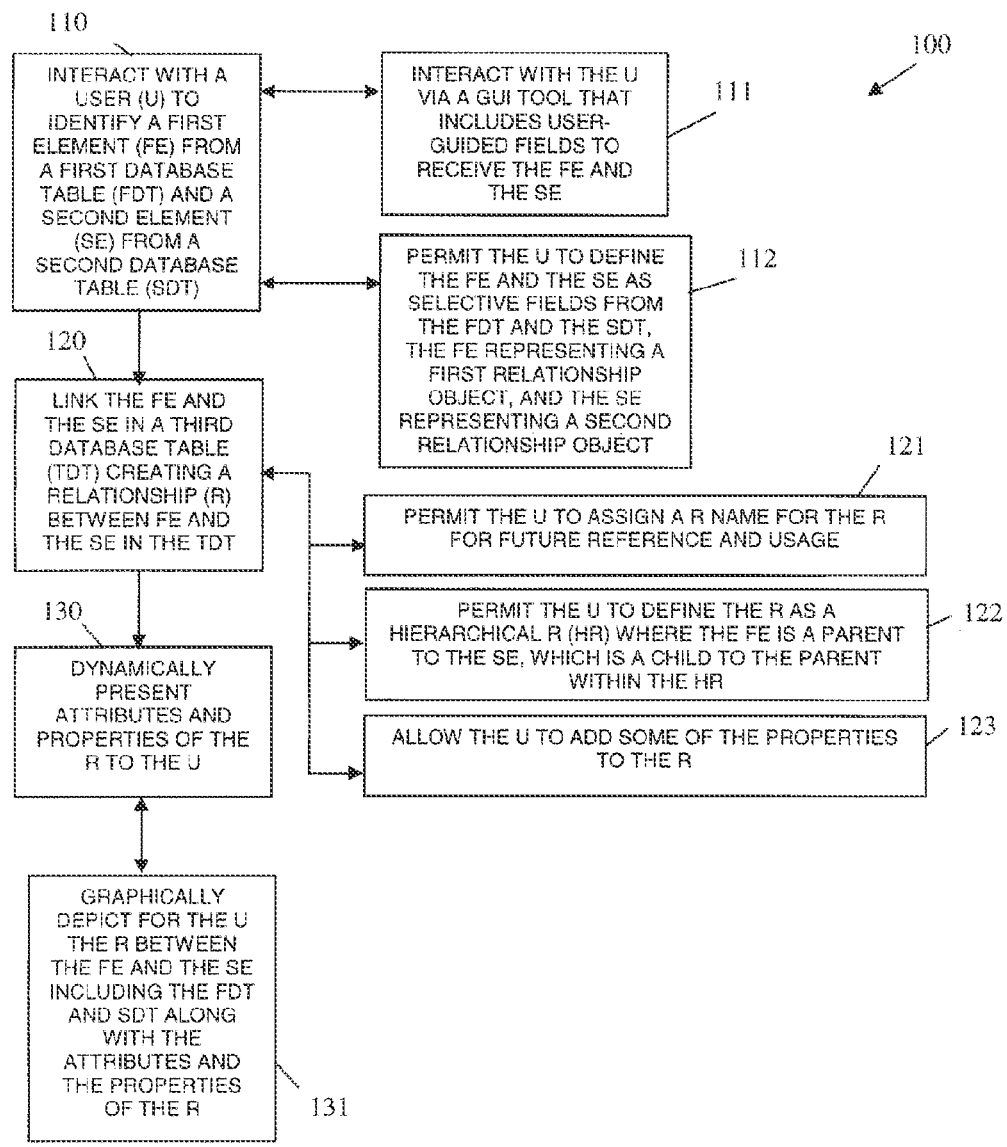
FIG. 1 is a diagram of a method for establishing a data relationship, according to an example embodiment.

FIG. 1 is a diagram of a method 100 for establishing a data relationship, according to an example embodiment. The method 100 (hereinafter "data relationship establishment service") is implemented in a machine-accessible or computer-readable storage medium as instructions that is executed by a machine (processing device (processor-enabled with memory; can also be a multiprocessor device) performs the processing depicted in FIG. 1. The machine specifically configured to process the data relationship establishment service. Moreover, the data relationship establishment service is optionally accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by Teradata, Inc. of Miamisburg, Ohio.

The data store includes a variety of enterprise information. One type of information is referred to as an "entity." An entity is something that can be uniquely identified (e.g., a customer account, a customer name, a household name, a logical grouping of certain types of customers, etc.).

The use of "entity" and "element" may be used interchangeably herein and below. Additionally, the use of "data store" and "database" may used interchangeably herein and below.

A table within the data store may include a schema that defines the relationship between one or more elements in the data store. For example, the relationship between data store element "household" to element "individual" and to element "account" (household→individual→account). The schema defines the fields or elements of the data store. The data store includes a plurality of different tables and different schema's. Schema relationships may be hierarchical or many-to-many relationships.

A "relational object" or a "relationship object" is a special grouping of database elements selected and defined by a user. The phrases "database object," "relational object," and "relationship object" may be used interchangeably herein.

Each element or relational object includes attributes and/or properties. Attributes and properties are values associated with an element or object, types of values, metadata about values, and the like. For example, an attribute/property of an element "house" may include a "color type" for the house, such as red. Metadata may indicate the house was painted red on a certain date and by a certain company.

It is within this context that the processing associated with the data relationship establishment service is now described in detail with reference to the FIG. 1.

At 110, the data relationship establishment service interacts with a user to identify a first element from a first database table and a second element from a second database table. It is noted that the first and second elements can be more than a single filed but can be composite information from the tables, such that they are each viewed as database objects or relational objects.

According to an embodiment, at 111, the data relationship establishment service interacts with the user via a GUI tool that includes user-guided fields to receive the first element and the second element from the user. Example screens of such a GUI tool are provided below with reference to the FIGS. 4-8.

In another case, at 112, the data relationship establishment service permits the user to define the first element and the second element as selective fields from the first database table and the second database table. Here, as stated above, the first element is a first relationship or relational object and the second element is a second relationship or relational object. So, the elements can be composite information from the databases selected by the user and essentially defined by the user.

At 120, the data relationship establishment service links the first element and the second element in a third database table. This table is newly established by the data relationship establishment service to create a relationship between the first element and the second element.

In an embodiment, at 121, the data relationship establishment service permits the user to assign a relationship name or label for the relationship. This permits the relationship name to be integrated into other applications for future usage in an automated fashion. This also permits reuse, such that users can local and retrieve particular relationships by their relationship names.

In a particular scenario, at 122, the data relationship establishment service permits the user to define the relationship as a hierarchical relationship where the first element is a parent to the second element; the second element a child to the parent within the hierarchical relationship. The parent itself can be a child to another parent and the child can be a parent to another child within the hierarchical relationship.

In still another situation, at 123, the data relationship establishment service allows the user to add some of the properties or some of the attributes to the relationship. So, new attributes/properties can be assigned and associated with just the newly created relationship by the user.

At 130, the data relationship establishment service dynamically presents the attributes and properties of the relationship to the user. This allows the user to interactive inspect and visualize all aspects of the relationship between the first and second elements.

According to an embodiment, at 131, the data relationship establishment service graphically depicts for the user the relationship between the first element and the second element. This graphical depiction can also include the first database table and the second database table with the attributes and the properties of the relationship. In fact, the graphical depiction can be interactive so more detail can be drilled down into or less detail can be abstracted up on direction of the user.

Figure 2:
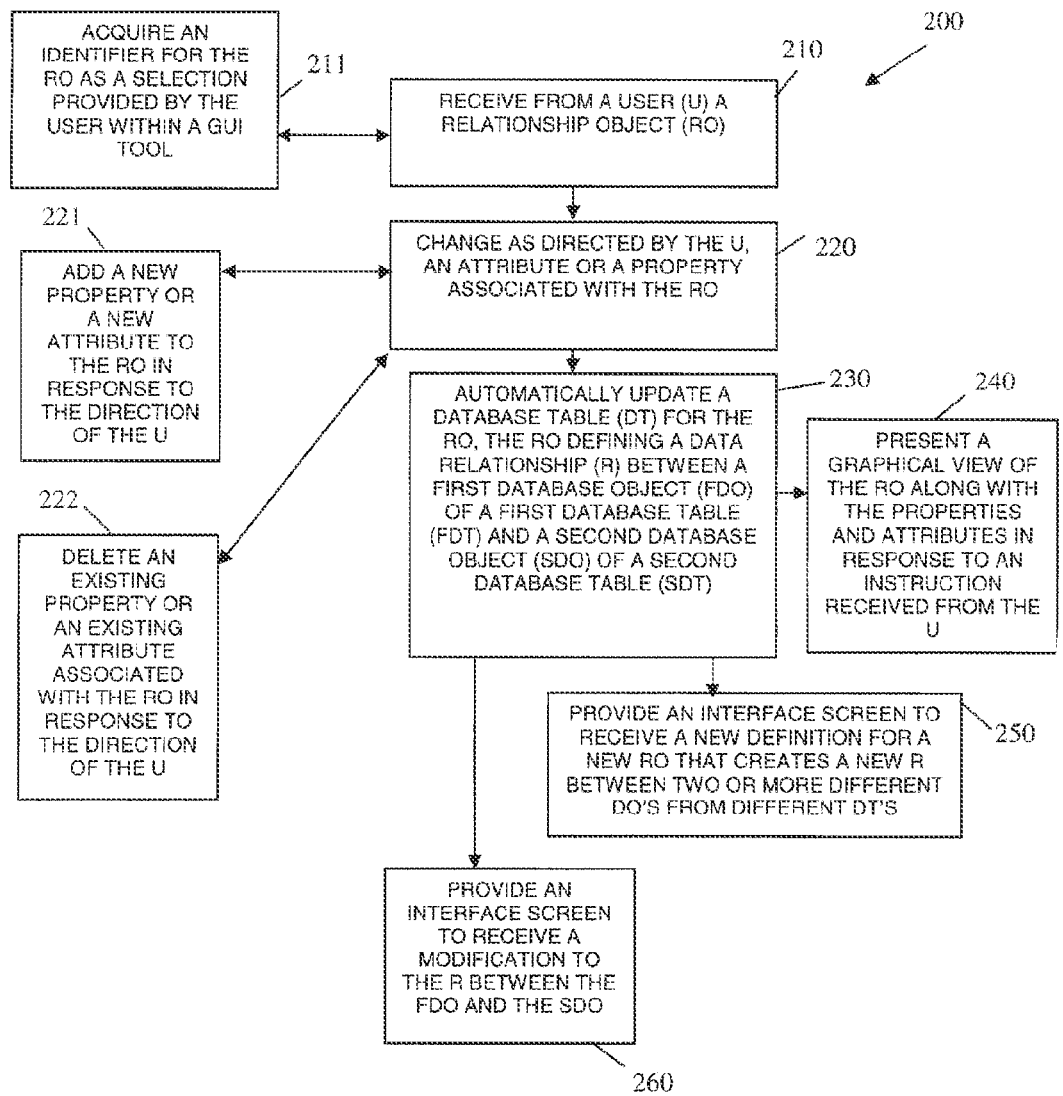
FIG. 2 is a diagram of a method for managing a data relationship, according to an example embodiment.

FIG. 2 is a diagram of a method 200 for managing a data relationship, according to an example embodiment. The method 200 (hereinafter "data relationship management service") is implemented in a machine-accessible or a computer-readable storage medium as instructions that are executed by a machine (one or more processors) and perform the processing reflected in FIG. 2. Again, the machine is specifically configured to process the data relationship management service. The data relationship management service may also be accessible over a network. The network may be wired, wireless, or a combination of wired and wireless.

The data relationship management service presents an alternative and in some cases an enhanced processing perspective to the data relationship establishment service represented by the method 100 of the FIG. 1. Specifically, the data relationship establishment service is focused on the initial creation of a data relationship and graphical presentation of that relationship along with its attributes and properties. The data relationship management service is focused on managing, controlling, customizing, and modifying such a data relationship as was established with the data relationship establishment service of the FIG. 1.

At 210, the data relationship management service receives from a user a relationship object. This can be done in a variety of manners.

For example, at 211, the data relationship management service acquires an identifier for the relationship object as a selection provided by the user within a GUI tool. This identifier can be typed into a field of the GUI or acquired via a pull down list selection, and the like.

At 220, the data relationship management service changes an attribute or property associated with the relationship object as directed by the user.

According to an embodiment, at 221, the data relationship management service adds a new attribute or a new property to the relationship object at the direction of the user.

In another case, at 222, the data relationship management service deletes an existing property or an existing attribute associated with the relationship object in response to direction provided by the user.

So, the changes are customized and user-driven.

At 230, the data relationship management service automatically updates a database table for the relationship object to reflect the change. The relationship object defines a data relationship between a first database object of a first database table and a second database object of a second database table. The relationship creation that embodies the relationship object was described in detail above with reference to the method 100 of the FIG. 1.

In an embodiment, at 240, the data relationship management service presents a graphical view of the relationship object along with the properties and attributes in response to an instruction to do so received from the user.

In another case, at 250, the data relationship management service provides an interface screen to receive a new definition for a new relationship object that creates a new relationship between different database objects from different database tables. In other words, the data relationship management service can act in a manner similar to the or as an enhanced version of the method 100 described above with reference to the FIG. 1.

Similarly, at 260, the data relationship management service provides another interface screen to receive a modification to the relationship between the first database object and the second database object.

So, the relationship object that embodies the relationship can be modified, deleted, created, controlled, and managed via the data relationship management service.

Figure 3:
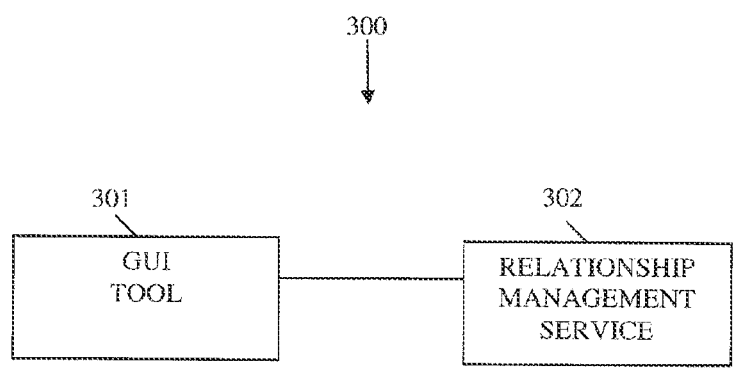
FIG. 3 is a diagram of a data relationship management system, according to an example embodiment.

FIG. 3 is a diagram of a data relationship management system 300, according to an example embodiment. The data relationship management system 300 is implemented in a machine-accessible and/or computer-readable storage medium that is executed by one or more processors and is operational over a network. The network may be wired, wireless, or a combination of wired and wireless.

In an embodiment, portions of the data relationship management system 300 implements, among other things the data relationship establishment service and the data relationship management service represented by the methods 100 and 200 of the FIGS. 1 and 2, respectively.

The data relationship management system 300 includes a GUI tool 301 and a relationship management service 302. Each of these and their interactions with one another will now be discussed in turn.

The GUI tool 301 is implemented in a computer-readable storage medium and is to execute on one or more processors of a network. Example aspects of the GUI tool 301 were presented above with reference to the methods 100 and 200 of the FIGS. 1 and 2, respectively. Moreover, example screen shots of the GUI tool 301 for sample data are provided below with reference to the FIGS. 4-8.

The GUI tool 301 is configured to interact with a user for selecting a first relational object and a second relational object.

In an embodiment, the first relational object is selected from a first database table and the second relational object is selected from a second database table. The first and second database tables are different from one another.

According to an embodiment, the GUI tool 301 is also configured to permit the user to modify the relationship (discussed below with reference to the relationship management service 302) via interactions with the relationship management service 302.

Also, in some cases, the GUI tool 301 is further configured to permit the user to create new relationships via interactions with the relationship management service. This was discussed above with reference to the methods 100 and 200 of the FIGS. 1 and 2, respectively.

In still other scenarios, the GUI tool 301 is configured to permit the user to delete the relationship (again discussed below) via interactions with the relationship management service 302.

The relationship management service 302 is implemented in a computer-readable storage medium and is to execute on one or more processors of the network. Processing aspects of the relationship management service 302 were presented above with reference to the methods 100 and 200 of the FIGS. 1 and 2, respectively.

The relationship management service 302 is configured to interface and interact with the GUI tool 301 to detect a user command to establish a relationship between the first relational object and the second relational object.

FIGS. 4-8 are sample Graphical User Interface (GUI) screens for defining and managing data relationships described in FIGS. 1-3, according to an example embodiment.

FIG. 4 depicts a GUI tool for which a user can define and create a relational object, some example fields of the tool are presented for purposes of illustration.

FIG. 5 depicts other screens of the GUI tool for which a user can define a data relationship between relational objects. With these screens a user can view, edit, delete, and create data relationships.

FIG. 6 depicts other screens of the GUI tool for which a user can define data relations and link data relationships.

FIG. 7 depicts a screen of the GUI that allows a user to view linked data relationships.

FIG. 8 depicts other screens of the GUI that permits a user to define additional attributes on the data relationships.

Figure 9:
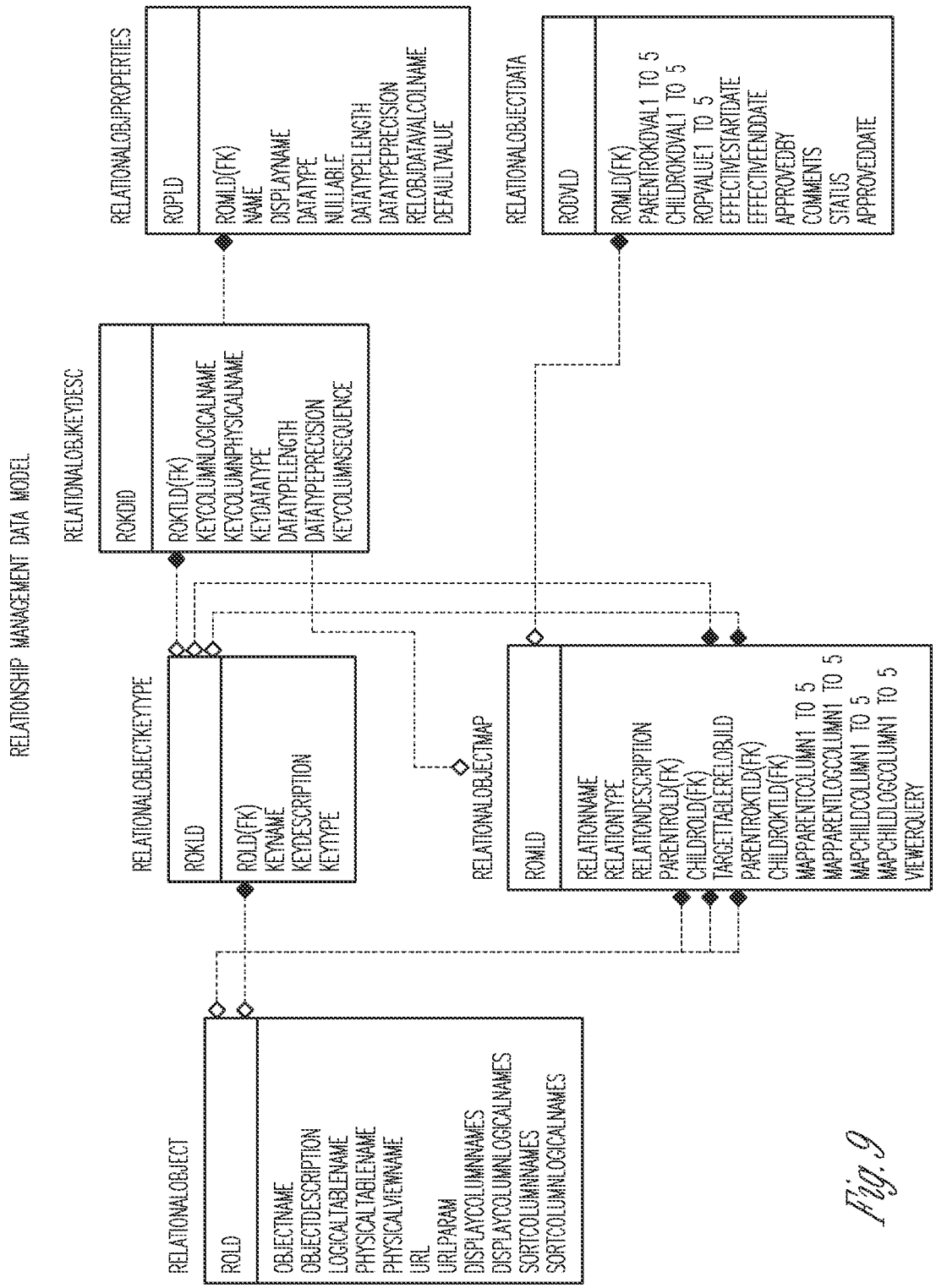
FIG. 9 is a relationship data model for a data relationship management system, according to an example embodiment.

FIG. 9 is a relationship data model for a data relationship management system, according to an example embodiment.

FIG. 9 infers that certain data model/entities are used to capture data relationships and the management of those data relationships. An example data model is presented with some sample elements in the FIG. 9 for purposes of illustration.

The Relational Object component of the FIG. 9 holds the actual master table names used to build the data relationship.

The Relational Object Key Type component of the FIG. 9 includes the various keys/links that any particular master table for which the relationship data is being captured/built.

The Relational Object Key Description component of the FIG. 9 includes the Key/link details like the column names both logical and physical and in case of composite, the sequence number is used to identify the sequences to that are defined. A table may have a single column key and multiple column keys; one entry for each key column is made into this table.

The Relational Object Map component of the FIG. 9 holds the relationship among the various relational objects defined; the relationship stored is in the form of parent-child.

The Relational Object Data component of the FIG. 9 is the actual mapping data holder.

The Relational Object Properties component of the FIG. 9 depicts properties that are associated with the relationship that can be captured. For example, approval history, effective dates, etc.

Now an example use case utilizing the model depicted in the FIG. 9 is presented for further illustration.

Consider that a user wants to link data of a Country having Country_Id (database element or field) as its primary key with a State table having State_Id (database element of field) as its primary key.

The tabular representation of Country, State and Relationship Data table is shown below:

TABLE 1

Country Database

| COUNTRY_ID | NAME | DESCRIPTION |
|---|---|---|
| 10 | USA | USA |
| 11 | IND | INDIA |

TABLE 2

State Database

| STATE_ID | NAME | DESCRIPTION |
|---|---|---|
| 100 | CA | California |
| 101 | KAR | Karnataka |

Relational Object Data Value (RODV) Database Table

Relational Object Data Value (RODV) Database Table

| COUNTRY_ID | STATE_ID |
|---|---|
| 10 | 100 |
| 11 | 101 |

How do the data relationship techniques, presented herein and above, help the user to achieve the above use case?

Solution: Identifying simple steps taken by the user:

1. Relational object is created using Table 1, and the primary keys/column (s) are selected for use in data linking.

2. Relational object is created using Table 2, and the primary keys/column (s) are selected for use in data linking.

3. A data relationship is created using these objects (tables 1 and 2); assume that Table 1 is a parent table and that Table 2 is a child table.

4. Mapping data of Table 1 and Table 2 is achieved; the user can select the relation and define the data for it by selecting a parent record from Table 1 and a child record from Table 2.

5. Mapping of data from Table 1 and Table 2 is created in the Table 3 (Relational Object Data) for only the primary keys/column(s) which was selected by user as link column (s) while defining the object in step 1. There is no database operation done on the actual table (Table 1 and Table 2) data.

It is noted that the Relational Object is logical representation of a master table/database views.

Once the logical linking of metadata and data is established. The hierarchical data view can be constructed in a hierarchy viewer.

Now some example source code that can be used to implemented portions of the techniques presented herein are presented. It is noted that other implementations that achieve the teachings presented herein and above can be used without departing from the embodiments of the invention.

Java Class Application Programming Interface (API) code sample:

```
1. public class RelationalObject
{
public static XMLform loadRelObj(OmxContext context)throws
XcoreException
    {
    // This method will call method to load the Relational Object in
    //Database.
    }
private static XMLform populateMDRMTables(String
sTableLogicalName, OmxContext context)
    {
    // This method will be used to populate MDRM Tables.
    }
private static XMLform insertRelationalObjectKeyDescription(String
strROKTId, DocumentProperty documentProperty, OmxContext
context)
    {
    //This Method will insert Relational Object Key Description
    }
private static String insertRelationalObject(Document, OmxContext
context)
    {
    //This Method will insert one Relational Object by extracting
the
    //information from the Document Object passed. The RoId will
be
    //returned which will used for Rel Obj Key Type.
    }
private static String insertRelationalObjectKeyType(String strRoID,
OmxContext context)
    {
    //This method will insert Record in RelationalObjectKeyType
Table
    //for a given RoId and will return RoktId
    }
private static HashMap getRelationObjectMap(OmxContext context)
    {
    //This Method will read Master Table Logical Name from
    //SYS_TABLE_MAP, which will be compared with
    MST_RELATIONAL_OBJECT //Table for existing Relational
    Objects. The Map contains the //Logical Name of Tables which
    are not present in Relational //Objects
    }
public static String getRelationalObjectID(String sObjectName,
OmxContext context)
    {
    //This Method will fetch the RO_ID from Relational Object
Table
    //based on the object Name.
    }
public static String getTargetTableRelObjId(OmxContext context)
    {
    // This Method will fetch the TargetTableRelObjId from
    Relational //Object Table based on the object Name.
```

Java Class Application Programming Interface (API) code sample:

```
    }
public static String getROKTId(String sRO_ID, OmxContext context)
    {
    //This Method will fetch the RoktId from
RelationalObjectKeyType
    //based on the object Name.
    }
}
2. public class RelationshipManagerOperation
{
public static XMLform linkRMData(XMLform
linkRodvDataRecordsForm, OmxContext context) throws XcoreException
    {
    // This method Link Parent and Child data
    }
private static XMLform addRODVData(XMLform parentCols,XMLform
childCols,String strRomId,OmxContext context)
    {
    // This method will add Link in RODV/Custom Tables
    //of the Primary Keys which Maps Parent and Child
    }
private static XMLform getCustomObjectPKs(String sRodvId,String
sObjectName,String sObjectTableLogicalName,OmxContext context)
    {
    //This will return all the PKs Mapped in ROKD and its //auto
    populated values in XML form object
    }
private static String getROTableLogicalName(String strRomId,
OmxContext context)
    {
    // This method will return Table Logical Name of Object
    //whose Id is stored in TargetTableRelObjId for a ROM_ID
    }
private static XMLform getRODVColumns(XMLform pForm,String
strRomId,OmxContext context,boolean is Parent)
    {
    // It will find RODV / Custom Tables Columns and Values To
    be //Linked
    }
private static String getStringValueOfProperty(Object object,OmxContext
context)
    {
    // It Returns Value of Property
    }
private static String getROKT_ID(String strRomId,OmxContext
context,boolean isParent)
    {
    // It Returns ROKT_ID from ROM Table
    }
public static String getRODVId(OmxContext context)
    {
    // This created sequence RODV_ID.
    }
public static XMLform getROMColumnMap(XMLform fRomId,
OmxContext context)
    {
    // This Method with return the Mapping of ROKD logical
columns
    //and RODV logical Columns
    }
public static XMLform getROKDColumnsMap(String strROKTId,String
strRomId, Boolean isParent,OmxContext context)
    {
    // This Method will return the Mapping of RODV Table or
    Custom Data //Holder logical columns
    }
public static XMLform getRODVColumnValues(String strEditCols,String
strEditColsVals,OmxContext context)
    {
    // This Method will return the comma count and edit
    //properties by parsing the String
    }
public static XMLform getROEditColumns(String strEditCols,
OmxContext context)
    {
    // This Method will return the comma count and edit
    //properties by parsing the String
```

-continued

Java Class Application Programming Interface (API) code sample:

```
    }
public static String generateRomId(XMLform sequenceNameXml
,OmxContext context)
    {
        // This will generate Sequence Id for a given
        //sequence name from ID_SQR Table
    }
}
    3. public class MdrmViewsOperations
{
public static XMLform getFilterQuery(XMLform viewFilterForm,
OmxContext context)throws XcoreException
    {
        // This method make the SQL Query on a database View for
        Filter //Condition given as Input
    }
public static XMLform getColumnPhysicalDataType(XMLform
docColumnDetailsForm,OmxContext context)throws XcoreException
    {
        // This method will return XML physical data type.
    }
}
            © Teradata, Inc. 2009
```

One now fully appreciates the improved techniques for managing data relationships presented herein and above. Specifically, the techniques presented herein directly integrate the management and visualization of data relationships. The allows database viewers to view, visualize, and interact with data relationships, while maintaining automated control of the underlying data of the database.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and executed on a processing device, the method comprising:

interacting, via the processing device, with a user to identify a first element from a first database table and a second element from a second database table, the first element is composite information from multiple tables and viewed as a first object, and the second element is other composite information from other multiple tables and viewed as a second object, wherein the first object is different from the second object;

linking, via the processing device, the first element and the second element in a third database table creating a relationship between the first element and the second element in the third database table, the third database table newly established to create the relationship and the third database table includes logical and physical details associated with the first element in the first database table and the second element in the second database table; and dynamically presenting, via the processing device, attributes and properties of the relationship to the user and making the relationship interactive permitting the user to inspect and visualize all aspects of the relationship and the user can drill down for more detail of the relationship or abstract up for less detail via interactions with the presented relationship, and the user permitted to: modify, delete, create, control, and manage the relationship between the first and second elements via the interactions and the relationship modified by those interactions in the first database table, the second database table, and the third database table for the objects to which the relationship is relevant to.

2. The method of claim 1, wherein interacting further includes interacting with the user via a Graphical User Interface (GUI) tool that includes user-guided fields to receive the first element and the second element.

3. The method of claim 1, wherein interacting further includes permitting the user to define the first element and the second element as selective fields from the first database table and the second database table, the first element representing a first relationship object, and the second element representing a second relationship object.

4. The method of claim 1, wherein linking further includes permitting the user to assign a relationship name for the relationship for future reference and usage.

5. The method of claim 1, wherein linking further includes permitting the user to define the relationship as a hierarchical relationship where the first element is a parent to the second element, which is a child to the parent within the hierarchical relationship.

6. The method of claim 1, wherein linking further includes allowing the user to add some of the properties to the relationship.

7. The method of claim 1, wherein presenting further includes graphically depicting for the user the relationship between the first element and the second element including the first database table and the second database table along with the attributes and the properties of the relationship.

* * * * *